United States Patent Office 3,594,258
Patented July 20, 1971

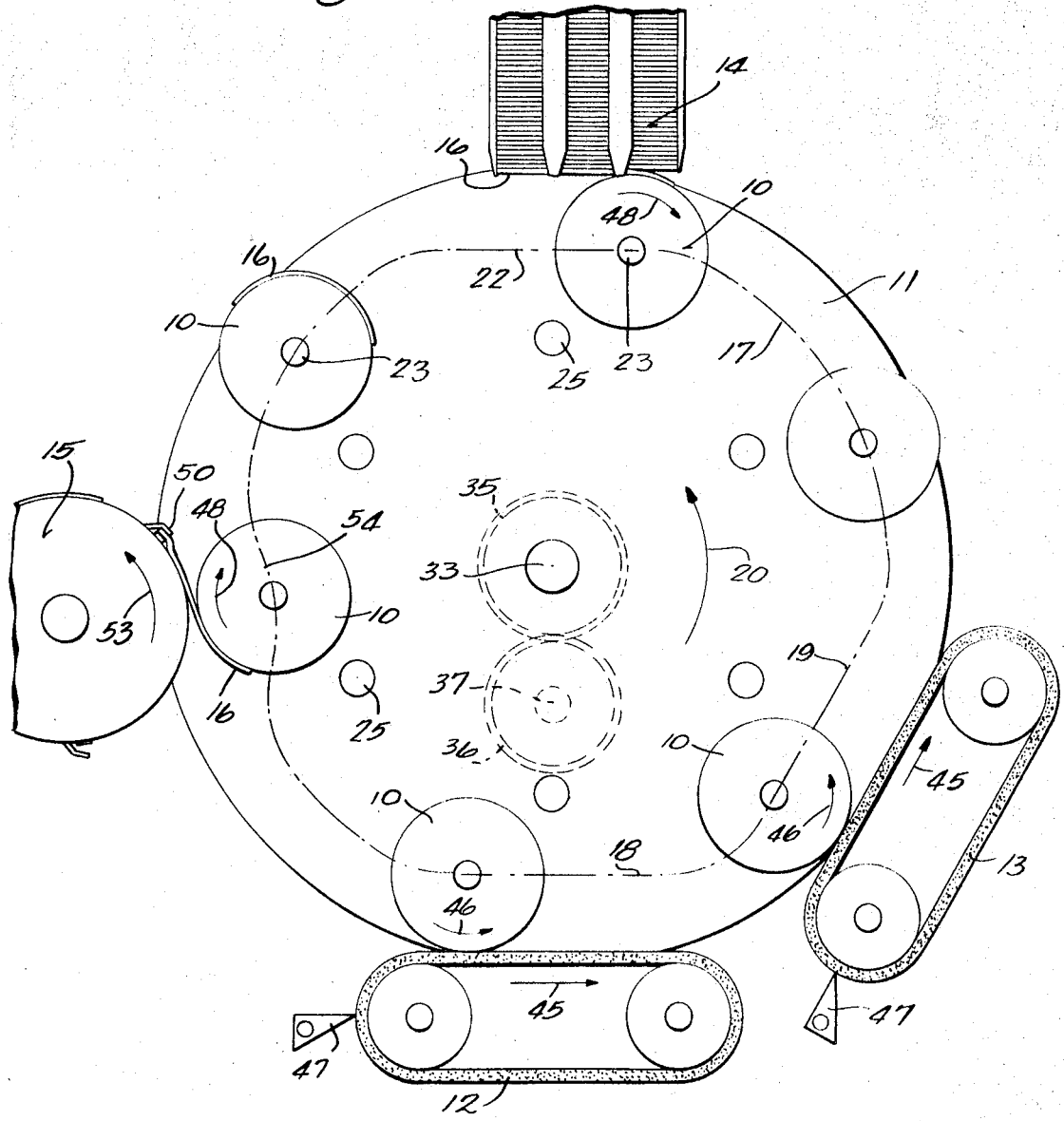

3,594,258
LABELING MACHINE
Karl Dullinger, Neutraubling, Germany, assignor to
Hermann Kronseder, Neutraubling, Germany
Filed Feb. 28, 1969, Ser. No. 803,143
Claims priority, application Germany, Mar. 6, 1968,
P 16 11 910.1
Int. Cl. B65c 9/08; B65h 1/06
U.S. Cl. 156—570                        10 Claims

ABSTRACT OF THE DISCLOSURE

A labeling machine having components such as a label magazine, labeling cylinder, and gluing mechanism clustered about the generally circular orbit of a series of label transfer shoes mounted on a rotating shoe carrier. Mechanism is provided to shape the orbit of the shoes to conform with the surface configuration of the said components for improved cooperation between the shoes and the components. Mechanism is also provided for rotating the shoes about their own axes in the proper direction and at the proper speed for label transfer purposes.

BACKGROUND OF THE INVENTION

In some other labeling mechanisms of the general type herein described, the orbit of the transfer shoes remains circular, notwithstanding the flatness of the front face of the label magazine and the elongated runs of the gluing belts. Accordingly, there is a problem in maintaining proper control and pressure between the periphery of the transfer shoes with the gluing belts and the label magazine. The circular orbit of the transfer shoes of such other labeling mechanisms does not conform to the flat or rectilinear surfaces of the label magazine and gluing belt. Moreover, the periphery of the labeling cylinder turns on a circular path which is in mirror image relation to the orbit of the shoes. Accordingly, there is only one point where the shoe surface comes closest to the labeling cylinder surface.

Still other labeling machines have been developed to conform or shape the shoe orbit to the surface configuration of the components clustered thereabout. In such another machine as developed by the assignee of this application, the shoes travel on a triangular orbit with three relatively long straight sides, one side being generally parallel to the label magazine and another side being generally parallel to the flat run of the gluing belt. This arrangement, however, is subject to the problem of the long straight sides of the triangle meeting at a sharp angle. This creates problems in abruptly changing the direction of shoe travel as the shoes orbit on their triangular course. At the corners of such triangle orbits, the shoes must change course through an angle of approximately 300 degrees. These sharp course deviations introduce unbalanced forces. The mass and momentum of the shoes inhibit rapid action and limit the speed of machine operation and introduce noise and jars which are undesirable.

Moreover, such other machines cannot have their transfer shoes very closely spaced because of mutual interference of the shoes in negotiating the sharp turns at the corners of the triangular orbit. This limitation in the number of transfer shoes reduces the capacity of the machine and militates against its use in high speed labeling applications.

SUMMARY OF THE INVENTION

According to the present invention, high speed operation with little jarring and noise is achieved in a construction in which the shoe orbit is shaped to run parallel to the facing surfaces of the components clustered about the orbit. The orbit is changed from circular to straight where the shoes pass the gluing belts and the flat front face of the label magazine. This change is accomplished gradually, and the shoes change course through relatively small angles. Moreover, the orbit can be shaped to be parallel to the curved periphery of the labeling cylinder, where such is desired.

The labeling mechanism of the present invention also has speed change apparatus by which the speed and direction of rotation of each shoe is independently controlled and correlated to the label magazine, labeling cylinder and gluing belts. This apparatus is integrated with the orbit shaping mechanism and includes rotating parts which do not unbalance the machine.

According to the present invention, the shoes are supported on a shoe carrier on mounts which are movable inwardly and outwardly with respect to the axis on which the carrier rotates. Each shoe mount is provided with a cam follower which tracks in a cam groove in a stationary cam plate. The cam groove has a profile which will cause the shoe mount to move inwardly and outwardly at a controlled rate to produce the desired shoe orbit shape to match the face of the component.

In preferred embodiments of the invention, the cam plate has a second groove in which a cam follower on a shoe speed change mechanism is mounted. This mechanism is geared to the shaft of the shoe to cause the shoe to rotate at a speed and in a direction determined by the profile of the cam groove. Accordingly, the shoes will not only change orbit, but will change speed and direction of rotation, depending on requirements.

Other objects, features, and advantages of the invention will appear from the following disclosure.

DESCRIPTION OF DRAWINGS

FIG. 3 is a diagrammatic plan view of a modified embodiment of the invention.

DESCRIPTION OF PREFERRED EMBODIMENTS

Figure 1:
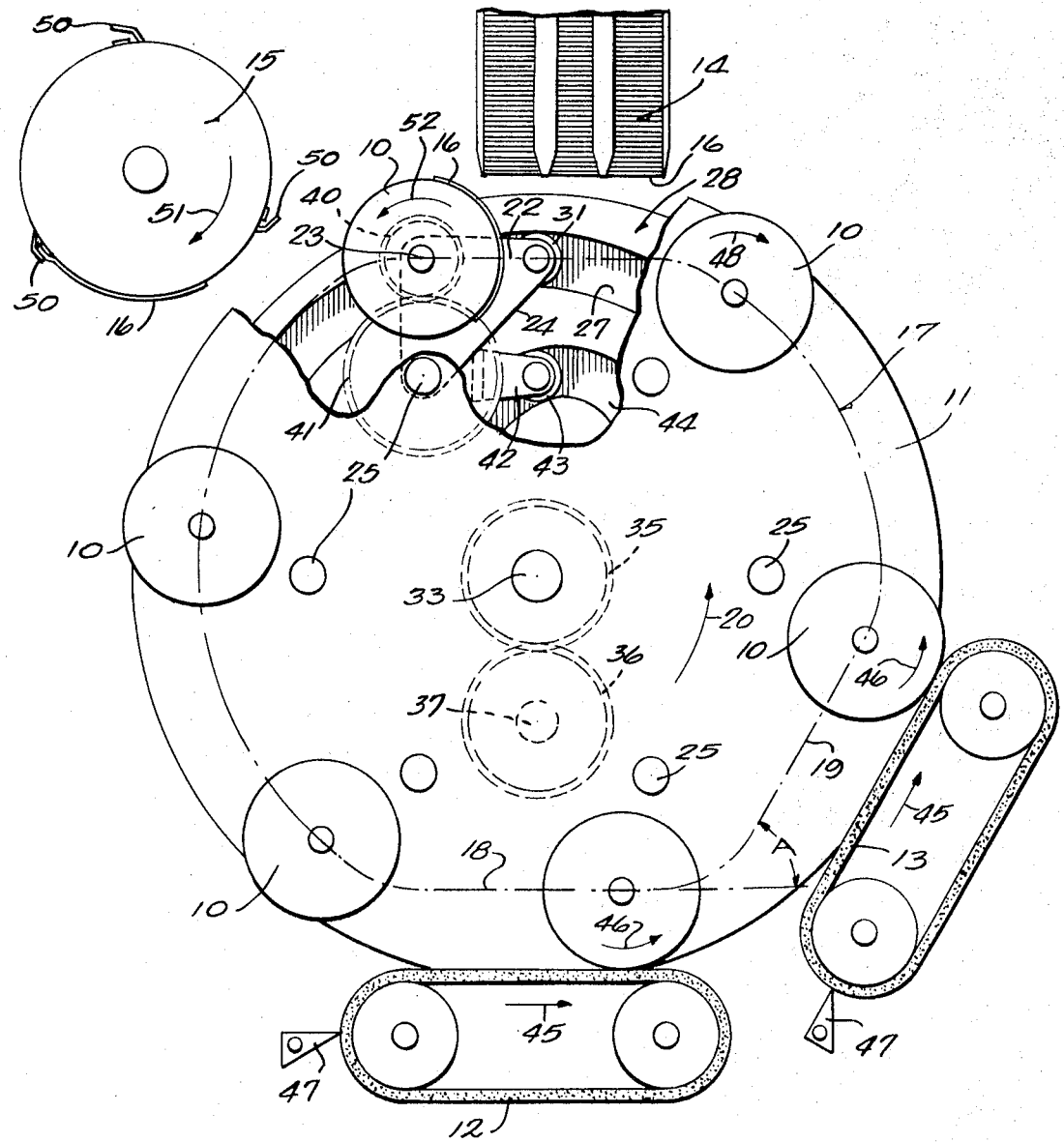
FIG. 1 is a diagrammatic plan view of labeling mechanism embodying the invention, with portions broken away to expose details.
Figure 2:
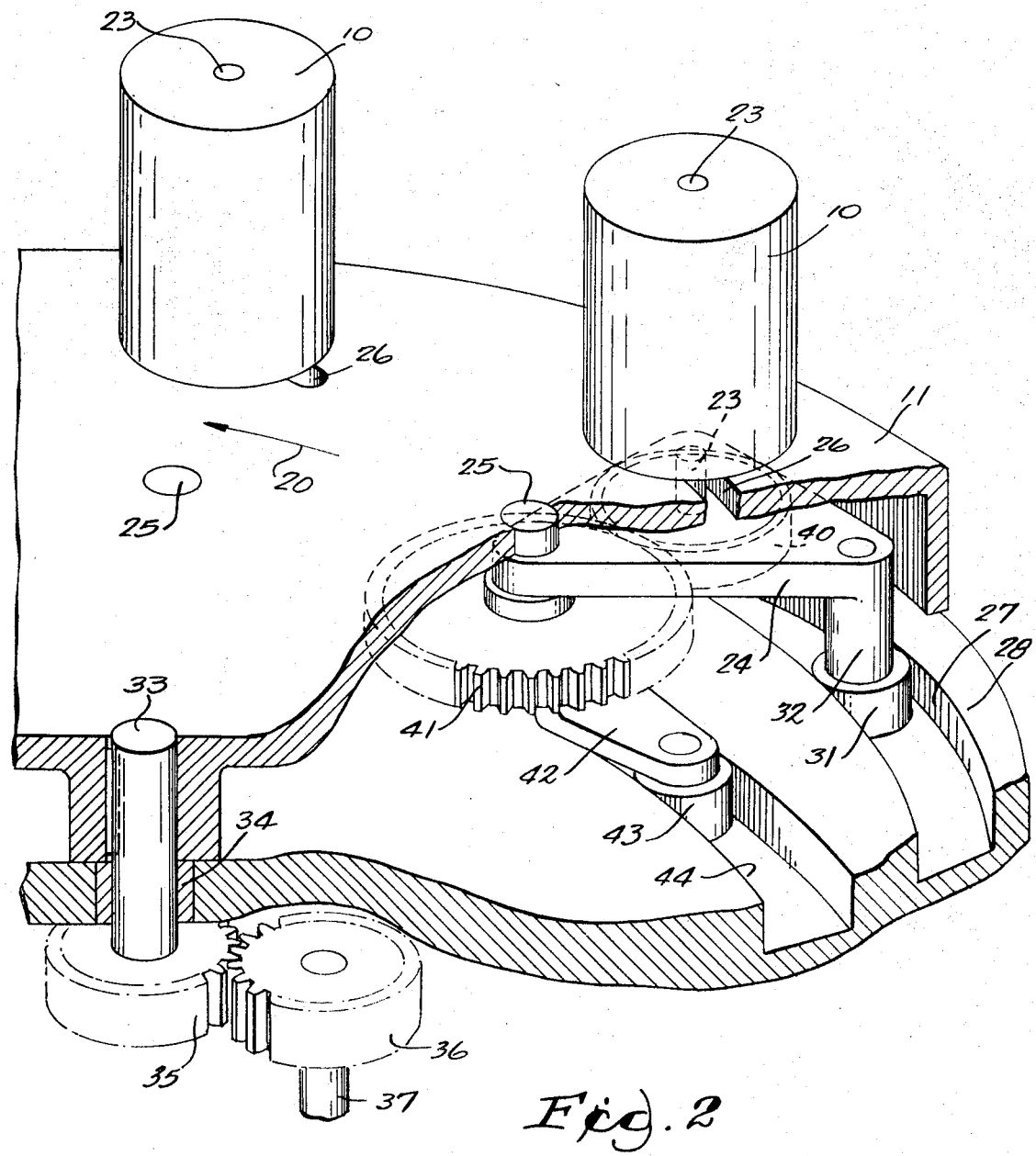
FIG. 2 is a fragmentary perspective view, partly in cross section, showing further details of the mechanism shown in FIG. 1.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

A series of rotary label transfer shoes 10 are mounted on a rotating shoe carrier 11. The rotating carrier 11 turns on the axis of its shaft 33 and orbits the shoes 10 in the direction of arrow 20 sequentially past various components, such as the gluing belts 12, 13, stationary label magazine 14, and label applying cylinder 15. Cylinder 15 is desirably of the construction shown in the copending U.S. patent application of Karl Dullinger, Ser. No. 663,289 filed Aug. 25, 1967. The glue belts 12, 13 could be omitted in the event label transfer is effectuated by suction, in which event the transfer shoes 10 would be provided with suction ports.

The glue belts 12, 13 have their inner runs disposed on a flat or rectilinear path. Moreover, the front of magazine 14 is also flat or rectilinear. Accordingly, the circular path of the rotating shoe carrier 11 is not well adapted to maintain the surface of the shoe 10 in contact with the belts 12, 13 and the foremost label 16 in magazine 14 as the shoes orbit past these components.

In accordance with the present invention, the orbit of the shoes 10 is flattened or otherwise shaped to run substantially parallel to the belts and label magazine. The generally circular orbit of the shoes 10 is indicated by the orbit path 17. Where the shoes 10 pass the flat belt 12, the orbit is flattened or straightened out at 18. Where the shoes 10 pass the flat belt 13, the orbit is flattened or straightened out at 19. Where the shoes 10 pass the flat front surface of the magazine 14, the orbit is flattened or straightened out at 22.

Particularly in cases where the label is large, for example, where the label is to be wrapped completely around the container, it is desirable to have two belts 12, 13 instead of one belt. This facilitates the application of a coating of glue to the entire peripheral surface of the shoes 10. Part of the shoe receives glue from one belt, and the other part of the shoe receives glue from the other belt.

It is clear from FIG. 1 that there is a relatively small angle A between the two flattened parts 18, 19 of the shoe orbit. Accordingly, the shoes are not required to make radical changes in course (only about 60 degrees in the illustrated embodiment), and the problems mentioned earlier with the triangle orbit of some other machines are avoided.

Each shoe 10 is mounted on a shaft 23 which, in turn, is mounted on a rocker arm 24 which has a fixed pintle 25 about which it may swing. To permit swinging motion of the shoe 10, the carrier 11 is provided with curvilinear slots 26 centered on pintle 25 and in which the shoe shaft 23 may move with a radial component with respect to the axis of shaft 23 on which the carrier 11 turns. Accordingly, the swinging motion of the rocker arm 24 at appropriate zones or time spans around its orbit will cause the shoes to assume any shape of orbit which is desired.

The orbit shape is determined by the profile of a cam groove 27 formed in a cam plate or disk 28 which is fixed with respect to the machine. Rocker arm 24 is provided with a cam follower roller 31 engaged in the cam groove 27. Roller 31 depends from the rocker arm 24 on a shaft 32.

The shoe carrier 11 is mounted for rotation about the axis of shaft 33 which has a bearing 34 on the stationary cam plate 28. At its lower end, shaft 33 has a gear 35 meshing with pinion 36 on drive shaft 37.

Accordingly, as shoe carrier 11 is rotated at a constant rate, cam 31 will follow the profile of cam 27 to swing rocker arm 24 in and out, so that it will orbit on the path 17 with its straight or rectilinear portions 18, 19, 22.

The shoe 10 is caused to rotate by a motion transmitting drive mechanism which consists of a gear 40 fixed on the lower end of shaft 23, a meshing gear 41 free to turn on shaft 25, a lever 42 which is fast to the gear 41, and a cam follower roller 43 which follows the profile of a second cam groove 44 formed in the cam plate 28. The gear 41 is much larger than gear 40 so that slight rotational movement of gear 41 will cause considerably greater rotational movement of the gear 40 and shoe 10. As the shoe 10 orbits past the belts 12, 13, the inner runs of which are moving in the direction of arrow 45, the shoes 10 will be made to turn counterclockwise in the direction of arrows 46, thus to roll backwards at the same rate as the belts move forward and pick up an even and smooth coating of glue therefrom. As hereinbefore noted, one-half of the surface of the shoe receives glue from belt 12, and the other one-half receives glue from belt 13.

The glue is applied to the belts 12, 13 by conventional gluing mechanism not shown. The thickness of the glue on the belts 12, 13, is determined by doctor blades 47. To produce continuous rotation of the shoes 10, as indicated by arrows 46, the cam groove 44 must be shaped to cause continuous swinging motion of the lever 42.

When the shoes orbit past the label magazine 14 to pick the foremost label 16 off of the magazine, the direction of shoe rotation is changed to clockwise, as indicated by arrow 48. This requires a reversal in the slope or profile of the cam groove 44, thus to cause the shoe to rotate clockwise at a rate which will exactly cancel out the orbiting speed of the carrier 11, so that the shoe will roll or walk across the foremost label 16 and pick the label out of the magazine without wrinkling or tearing it. The fact that the orbit 22 is straight opposite magazine 14 further improves the smoothness of transfer of the label, inasmuch as the labels will not be pushed back into the magazine or otherwise disturbed in their orientation, as would occur if the shoe orbit were circular over this segment thereof.

In FIG. 1, the labeling cylinder 15 rotates clockwise, as shown by arrow 51. Accordingly, in order to smoothly transfer the label from the shoe 10 to the cylinder 15, the direction of shoe rotation must be again reversed to rotate counterclockwise, as shown by arrow 52. This again necessitates reversal in the slope or profile of the cam groove 44, thus to swing the arm 42 in a direction to cause counterclockwise rotation of the shoe 10. The speed of shoe rotation is brought to match the speed of the labeling cylinder rotating clockwise in the direction of arrow 51. This results in the smooth transfer of the label 16 to the cylinder 15. Cylinder 15 has finger grippers 50 which mechanically grasp the label.

FIG. 3 illustrates another embodiment in which like parts are given the same reference characters, but in which the labeling cylinder 15 rotates counterclockwise in the direction of arrow 53. Accordingly, the shoes 10 are made to rotate in the clockwise direction in arrows 48 as they pass the labeling cylinder 15 for smooth transfer of the label 16 thereto. This view also illustrates a change in the shoe orbit at 54 to be curvilinearly parallel to the cylindrical surface of the label cylinder 15. The profile of the cam groove 22 is so shaped as to produce the curved orbit 54 as the shoes pass the label cylinder 15. This arrangement increases the time span during which the shoe surface is close to the cylinder surface, thus to further smooth the transfer of the label.

Accordingly, the device of the present invention is capable of either flattening the shoe orbit, as shown at 18, 19, 22, but also can shape the orbit to a curvilinear path as shown at 54, depending on the configuration of the apparatus with which the shoe coacts.

I claim:

1. In a labeling machine having a label magazine with a flat front face adjacent the orbit of a series of label transfer shoes, a rotatable shoe carrier and mechanism for rotating the shoes about their own axes to correlate the speed of the shoe surface to the magazine, the improvement in which the orbit of the shoes may be shaped to have a straight portion substantially parallel to the flat face of the label magazine, said improvement comprising a shoe mount movable inwardly and outwardly with respect to the axis of shoe carrier, a cam and a cam follower connected to said mount, said cam having a profile which will cause the shoe mount to move to produce the said straight shoe orbit portion.

2. In a labeling machine having a label magazine and a labeling cylinder arranged about the orbit of a series of label transfer shoes, a rotatable shoe carrier and mechanism for rotating the shoes about their own axes to match shoe surface speed to the relative speed of the magazine and labeling cylinder, the improvement in which the orbit of the shoes may be shaped to depart from circular, said improvement comprising a shoe mount movable inwardly and outwardly with respect to the axis of shoe carrier, a cam and a cam follower connected to said mount, said cam having a profile which will cause the shoe mount to produce the desired shoe orbit shape, said mount comprising a rocker arm on which the shoe is mounted, said cam comprising a stationary plate with a cam groove therein, said cam follower comprising a roller attached to the rocker arm and disposed in said groove.

3. The invention of claim 1 in which the mechanism for rotating the shoes comprises a second cam, a second cam follower and motion transmitting mechanism from the second cam follower to the shoe to rotate the shoe in accordance with the profile of the second cam.

4. The invention of claim 2 in which the mechanism for rotating the shoes comprises a second cam groove in said plate, a second cam follower in said groove and motion transmitting connections from the second cam follower to the shoe to rotate the shoe in accordance with the profile of the second cam.

5. The invention of claim 4 in which the motion transmitting connection comprises gears respectively on the shoe and connected to the second cam follower.

6. The invention of claim 5 in which the gear connected to the second cam follower has a shaft, said rocker arm being pivotally mounted on said shaft.

7. In a labeling machine having a label magazine and a labeling cylinder arranged about the orbit of a series of label transfer shoes, a rotatable shoe carrier and mechanism for rotating the shoes about their own axes to match shoe surface speed to the relative speed of the magazine and labeling cylinder, the improvement in which the orbit of the shoes may be shaped to depart from circular, said improvement comprising a shoe mount movable inwardly and outwardly with respect to the axis of shoe carrier, a cam and a cam follower connected to said mount, said cam having a profile which will cause the shoe mount to move to produce the desired shoe orbit shape, said labeling machine also having a gluing mechanism including a belt having a flat run along side the shoe carrier, said cam having a profile which will flatten the shoe orbit to run parallel to the flat run of the glue belt.

8. The invention of claim 7 in which said labeling machine has a second gluing belt having a flat run at an angle to the flat run of the first mentioned belt, said cam having a profile which will flatten the shoe orbit to run parallel to the flat run of the second glue belt.

9. In a labeling machine having a label cylinder adjacent the orbit of a series of label transfer shoes, said labeling cylinder being rotatable on its axis so that its periphery turns on a curvilinear path, a rotatable shoe carrier and mechanism for rotating the shoes about their own axes to correlate shoe surface speed to the speed of the labeling cylinder, the improvement in which the orbit of the shoes may be shaped to have a curvilinear portion substantially parallel to the curvilinear path of the periphery of the labeling cylinder, said improvement comprising a shoe mount movable inwardly and outwardly with respect to the axis of the shoe carrier, a cam and a cam follower connected to said mount, said cam having a profile which will cause the shoe mount to move to produce the said curvilinear shoe orbit portion.

10. In a labeling machine having a gluing belt with a flat run adjacent the orbit of a series of label transfer shoes, a rotatable shoe carrier and mechanism for rotating the shoes about their own axes to correlate the speed of the shoe surface to the speed of the glue belt, the improvement in which the orbit of the shoes may be shaped to have a straight portion substantially parallel to the flat run of the gluing belt, said improvement comprising a shoe mount movable inwardly and outwardly with respect to the axis of the shoe carrier, a cam and a cam follower connected to said mount, said cam having a profile which will cause the shoe mount to move to produce the said straight shoe orbit portion.

References Cited

UNITED STATES PATENTS

| | | | |
|---|---|---|---|
| 2,449,298 | 9/1948 | Hoppe | 156—568X |
| 3,450,591 | 6/1969 | Zodrow | 156—571 |

BENJAMIN A. BORCHELT, Primary Examiner

J. M. HANLEY, Assistant Examiner

U.S. Cl. X.R.

271—41